US009401174B2

(12) United States Patent
Howley et al.

(10) Patent No.: US 9,401,174 B2
(45) Date of Patent: Jul. 26, 2016

(54) SYSTEMS AND METHODS FOR MULTI-PATH PREAMPLIFIER FAULT PROCESSING (71) Applicant: Avago Technologies General IP (Singapore) Pte. Ltd., Singapore (SG)

(72) Inventors: James P. Howley, Denver, CO (US); Suharli Tedja, San Ramon, CA (US); Adam Lipsey, Prior Lake, MN (US); Daniel James Dolan, Jr., Cottage Grove, MN (US); David W. Kelly, Eagan, MN (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/556,379

(22) Filed: Dec. 1, 2014

(65) Prior Publication Data
US 2016/0155464 A1 Jun. 2, 2016

(51) Int. Cl.
*G11B 5/02* (2006.01)
*G11B 27/36* (2006.01)
*G11B 19/04* (2006.01)
*G11B 5/09* (2006.01)

(52) U.S. Cl.
CPC ............... *G11B 19/048* (2013.01); *G11B 5/09* (2013.01)

(58) Field of Classification Search
CPC .... G11B 27/36; G11B 5/012; G11B 2220/20; G11B 2220/90; G11B 5/02; G11B 5/09
USPC ............. 360/25, 31, 39, 46, 53, 72.1, 49, 68
See application file for complete search history.

(56) References Cited

U.S. PATENT DOCUMENTS

| 8,208,356 B2* | 6/2012 | Ishihara | G11B 20/18 356/237.2 |
| 8,570,681 B2* | 10/2013 | Ho | G11B 5/59666 360/49 |
| 8,824,074 B1 | 9/2014 | Yang et al. | |
| 8,964,320 B1* | 2/2015 | Hu | G11B 19/048 360/25 |
| 2003/0182070 A1 | 9/2003 | Zhu et al. | |

* cited by examiner

*Primary Examiner* — Nabil Hindi (57) ABSTRACT

Systems and method relating generally to data processing, and more particularly to systems and methods for utilizing multiple data streams for data recovery from a storage device.

19 Claims, 6 Drawing Sheets

SYSTEMS AND METHODS FOR MULTI-PATH PREAMPLIFIER FAULT PROCESSING

FIELD OF THE INVENTION

Systems and methods relating generally to data processing, and more particularly to multi-path fault processing in a preamplifier circuit.

BACKGROUND

A storage device may include a number of media surfaces that are each able to store information written thereto. In some cases the surfaces may include defective areas that are not suitable for reliable data storage. It is desirable to map the defective areas and prevent there use for data storage. Such mapping can be time consuming, and thus costly to a manufacturing process.

Hence, for at least the aforementioned reasons, there exists a need in the art for advanced systems and methods for characterizing the surface of media surfaces.

SUMMARY

Systems and methods relating generally to data processing, and more particularly to multi-path fault processing in a preamplifier circuit.

Various embodiments of the present invention provide preamplifier circuits that are implemented on a single integrated circuit. The single integrated circuit includes a first flaw scan detector circuit and a second flaw scan detector circuit. The first flaw scan detector circuit is operable identify a first flaw on a first surface of a storage medium based upon a first information set corresponding to the first surface. The second flaw scan detector circuit is operable identify a second flaw on a second surface of a storage medium based upon a second information set corresponding to the first surface.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Systems and methods relating generally to data processing, and more particularly to multi-path fault processing in a preamplifier circuit.

Various embodiments of the present invention provide preamplifier circuits that are implemented on a single integrated circuit. The single integrated circuit includes a first flaw scan detector circuit and a second flaw scan detector circuit. The first flaw scan detector circuit is operable identify a first flaw on a first surface of a storage medium based upon a first information set corresponding to the first surface. The second flaw scan detector circuit is operable identify a second flaw on a second surface of a storage medium based upon a second information set corresponding to the first surface.

In some instances of the aforementioned embodiments, the single integrated circuit further includes an amplifier circuit operable to amplify a third information set derived from a third sensor. In some such instances, the information corresponding to the first surface is derived from a first sensor disposed in relation to the first surface, and the information corresponding to the second surface is derived from a second sensor disposed in relation to the second surface. In particular cases, the preamplifier circuit is implemented as part of a storage system, and the storage system includes a head disposed in relation to the first surface of the storage medium, wherein the head includes the first sensor and the third sensor. In one particular case, the first sensor is a temperature sensor, and the third sensor is a data sensor. In various particular cases, the storage system further includes the storage medium. In one case the storage system is a hard disk drive.

In one or more instances of the aforementioned embodiments, the first flaw scan detector is a first thermal asperity based flaw scan detector circuit, and the second flaw scan detector is a second thermal asperity based flaw scan detector circuit. In various instances of the aforementioned embodiments, the single integrated circuit further includes a selector circuit. The selector circuit is operable to: receive a first input derived from a first sensor disposed in relation to the first surface, a second input derived from a second sensor disposed in relation to the second surface, and a third input derived from a third sensor disposed in relation to a third surface; select the first input as the first information set; and select the second input as the second information set. In some cases, a first parameter governing operation of the first flaw scan detector circuit is programmable to a value independent of a second parameter governing operation of the second flaw scan detector circuit.

Other embodiments of the present invention provide methods for performing storage surface flaw scan. The methods include providing a single integrated circuit that has a first flaw scan detector circuit and a second flaw scan detector circuit. The methods further include: receiving a first information set corresponding to a first surface; applying a first flaw scan detection algorithm by the first flaw scan detector circuit to identify a first flaw on the first surface; receiving a second information set corresponding to a second surface; and applying a second flaw scan detection algorithm by the second flaw scan detector circuit to identify a second flaw on the second surface. In some instances, the single integrated circuit further includes an amplifier circuit, and in such instances the methods are further operable to amplify a third information set derived from a third sensor. In some cases, the information corresponding to the first surface is derived from a first sensor disposed in relation to the first surface, and the information corresponding to the second surface is derived from a second sensor disposed in relation to the second surface. In various cases, where the first sensor and the third sensor are incorporated in a head, the methods may further include disposing the head in relation to the first surface of the storage medium. In particular cases, the first sensor is a temperature sensor, and the third sensor is a data sensor.

In various instances of the aforementioned embodiments, the first flaw scan detector is a first thermal asperity based flaw scan detector circuit, and the second flaw scan detector is a second thermal asperity based flaw scan detector circuit. In one or more cases, the methods further include: receiving a first input derived from a first sensor disposed in relation to the first surface at the single integrated circuit; receiving a second input derived from a second sensor disposed in relation to the second surface at the single integrated circuit; receiving and a third input derived from a third sensor disposed in relation to a third surface at the single integrated circuit; selecting the first input as the first information set; and selecting the second input as the second information set. In various instances, the methods further include: programming a first parameter governing operation of the first flaw scan detector circuit; and programming a second parameter governing operation of the second flaw scan detector circuit. Programming the first parameter is independent of programming the second parameter.

Figure 1A:
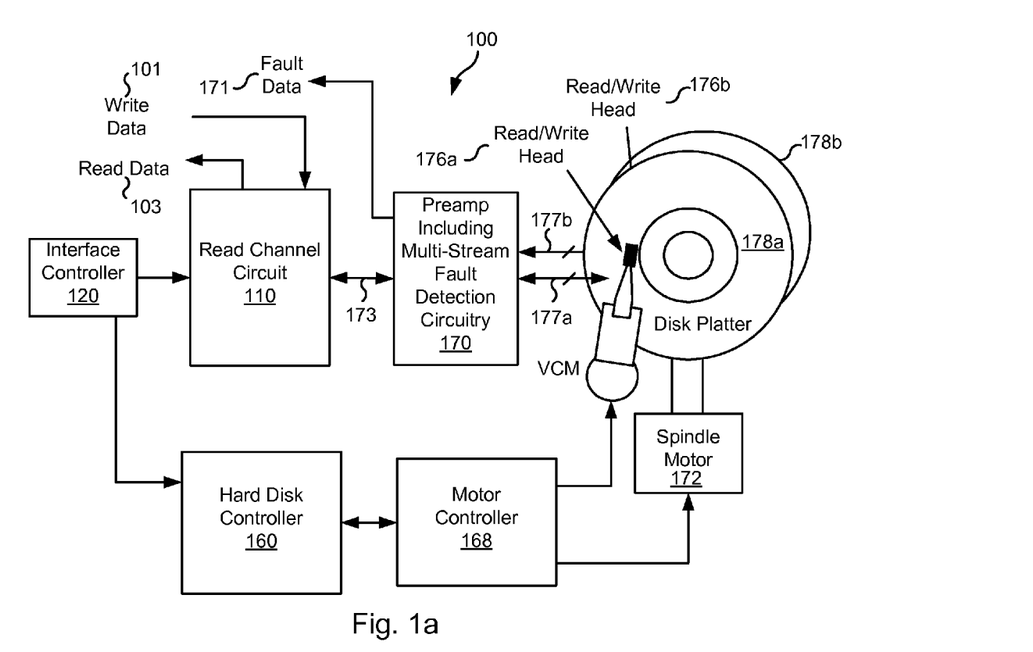
FIGS. 1a-1b show a storage system that includes a preamplifier circuit having multi stream fault detection circuitry in accordance with various embodiments of the present invention.
Figure 1B:
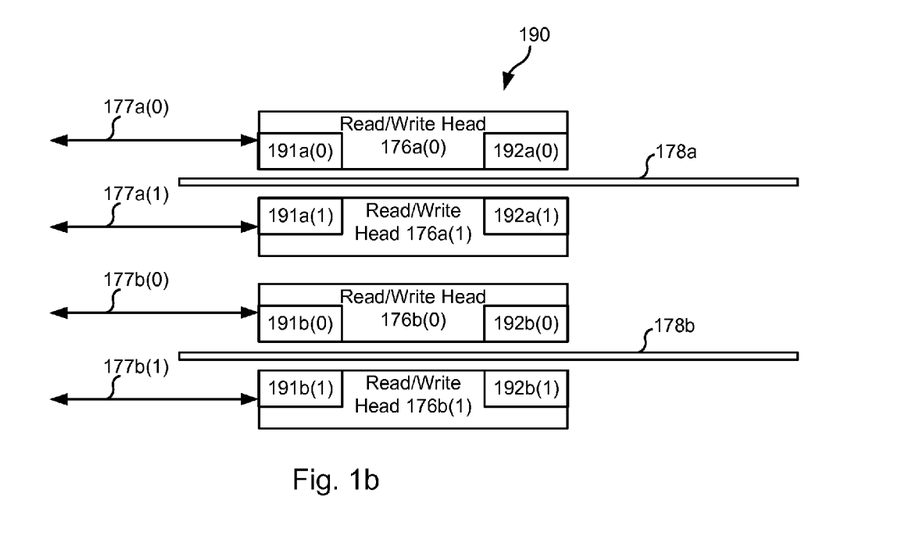

Turning to FIG. 1a, a storage system 100 is shown that includes a preamplifier circuit 170 having multi stream fault detection circuitry in accordance with various embodiments of the present invention. Each of read/write heads 176a and 176b provide respective signals 177a, 177b. In particular, signals 177a are communicably coupled between read/write head 176a and preamplifier circuit 170 and include a data signal representative of information sensed from disk platter 178a and a temperature signal, and signals 177b are communicably coupled between read/write head 176b and preamplifier circuit 170 and include a data signal representative of information sensed from disk platter 178b and a temperature signal. Turning to FIG. 1b, a cross section 190 shows read/write heads 176 disposed in relation to respective disk platters 178. In particular, one read/write head 176a has a first side 176a(0) disposed in relation to a first surface of a disk platter 178a, and a second side 176a(1) disposed in relation to a second surface of disk platter 178a; and another read/write head 176b has a first side 176b(0) disposed in relation to a first surface of a disk platter 178b, and a second side 176b(1) disposed in relation to a second surface of disk platter 178b. Each of read/write heads 176a, 176b include both a temperature sensor 191 and a data sensor 192. In particular, read/write head 176a(0) includes a temperature sensor 191a(0) and a data sensor 192a(0); read/write head 176a(1) includes a temperature sensor 191a(1) and a data sensor 192a(1); read/write head 176b(0) includes a temperature sensor 191b(0) and a data sensor 192b(0); and read/write head 176b(1) includes a temperature sensor 191b(1) and a data sensor 192b(1). Information from the respective combinations of data sensor 192 and temperature sensor 191 are provided as respective signals 177.

Returning to FIG. 1a, in addition, storage system 100 includes multiple read/write heads 176 that are each disposed in relation to respective disk platters 178. In addition, storage system 100 includes a read channel circuit 110, a hard disk controller 160, a motor controller 168, a spindle motor 172, and an interface controller 120. Interface controller 120 controls addressing and timing of data to/from disk platters 178a, 178b, and interacts with a host controller (not shown). The data on disk platter 178a, 178b consists of groups of magnetic signals that may be detected by read/write heads 176a, 176b when the head is properly positioned over a selected one of disk platters 178a, 178b. In one embodiment, disk platters 178a, 178b include magnetic signals recorded in accordance with either a longitudinal or a perpendicular recording scheme.

In a typical read operation, read/write heads 176a, 176b are accurately positioned by motor controller 168 over a desired data track on disk platters 178a, 178b. Motor controller 168 both positions read/write heads 176a, 176b in relation to disk platters 178a, 178b and drives spindle motor 172 by moving read/write heads 176a, 176b to the proper data track on disk platters 178a, 178b under the direction of hard disk controller 166. Spindle motor 172 spins disk platters 178a, 178b at a determined spin rate (RPMs). Once read/write heads 176a, 176b are positioned adjacent the proper data track, magnetic signals representing data on disk platters 178a, 178b are sensed by the data sensors 192 included in read/write heads 176a, 176b as disk platters 178a, 178b are rotated by spindle motor 172.

Each of signals 177 (including temperature and data signals) are provided from the respective read/write heads 176 to preamplifier circuit 170. Preamplifier circuit 170 amplifies a selected information set derived from one of the data sensors 192 that is included in one of signals 177 and provides the result as an amplified data output 173 to a read channel circuit 110. Data output 173 is provided as a continuous, minute analog signal representative of the magnetic data on disk platters 178a, 178b.

In addition, preamplifier circuit 170 selects a subset of two or more of signals 177 and processes the information derived from the respective temperature sensors 191 to determine if the surface of disk platters 178a, 178b are defective. Preamplifier circuit 170 processes the information derived from the respective temperature sensors 191 and provides resulting defect information as fault data 171 to a host controller (not shown). In turn, the host controller maintains a map of the defective areas and prevents later storage to the identified areas. Physical defects on the surface of disk platter 178 pose a reliability risk for data stored thereon. In order to minimize this risk, a manufacturer uses the fault detection processes provided by preamplifier circuit 170 to map defective areas during manufacture. By providing a preamplifier circuit with multi-stream fault detection circuitry, the time required to map the surface of disk platters 178a, 178b can be significantly reduced. This reduction in time required to perform fault detection processing during manufacture can reduce manufacturing costs associated with storage system 100. The defect detection is performed using temperature information derived from temperature sensors 191 associated with the respective read/write heads 176a, 176b. In particular, a defect is detected where surface of disk platters 178a, 178b are uneven such that one or more of read/write heads fly very near the surface or even contact the surface of disk platters 178a, 178b resulting in a discernable increase in temperature. Preamplifier circuit 170 may be implemented similar to that discussed in relation to one of FIG. 2. FIG. 3 or FIG. 6 below, and/or may perform a process similar to that discussed below in relation to one of FIG. 4 or FIG. 5.

In a typical read operation, read/write heads 176a, 176b are accurately positioned by motor controller 168 over a desired data track on disk platters 178a, 178b. Motor controller 168 both positions read/write heads 176a, 176b in relation to disk platters 178a, 178b and drives spindle motor 172 by moving read/write heads 176a, 176b to the proper data track on disk platters 178a, 178b under the direction of hard disk controller 166. Spindle motor 172 spins disk platters 178a, 178b at a determined spin rate (RPMs). Once read/write heads 176a, 176b are positioned adjacent the proper data tracks, magnetic signals representing data on disk platters 178a, 178b are sensed by read/write heads 176a, 176b as disk platters 178a, 178b are rotated by spindle motor 172. The sensed magnetic signals are provided as a continuous, minute analog signal representative of the magnetic data on disk platters 178a, 178b. This minute analog signal is transferred from read/write heads 176a, 176b to read channel circuit 110 via preamplifier 170. Preamplifier 170 is operable to amplify the minute analog signals accessed. In turn, read channel circuit 110 processes the three amplified signal including applying data decoding to the signal to recreate the information originally written to disk platters 178a, 178b. This data is provided as read data 103 to a receiving circuit. A write operation is substantially the opposite of the preceding read operation with write data 101 being provided to read channel circuit 110. This data is then encoded and written to disk platters 178a, 178b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platters 178a, 178b. This solid state memory may be used in parallel to disk platters 178a, 178b to provide additional storage. In such a case, the solid state memory receives and provides information directly to read channel circuit 110. Alternatively, the solid state memory may be used as a cache where it offers faster access time than that offered by disk platters 178a, 178b. In such a case, the solid state memory may be disposed between interface controller 120 and read channel circuit 110 where it operates as a pass through to disk platters 178a, 178b when requested data is not available in the solid state memory or when the solid state memory does not have sufficient storage to hold a newly written data set. Based upon the disclosure provided herein, one of ordinary skill in the art will recognize a variety of storage systems including both disk platters 178a, 178b and a solid state memory.

Figure 2:
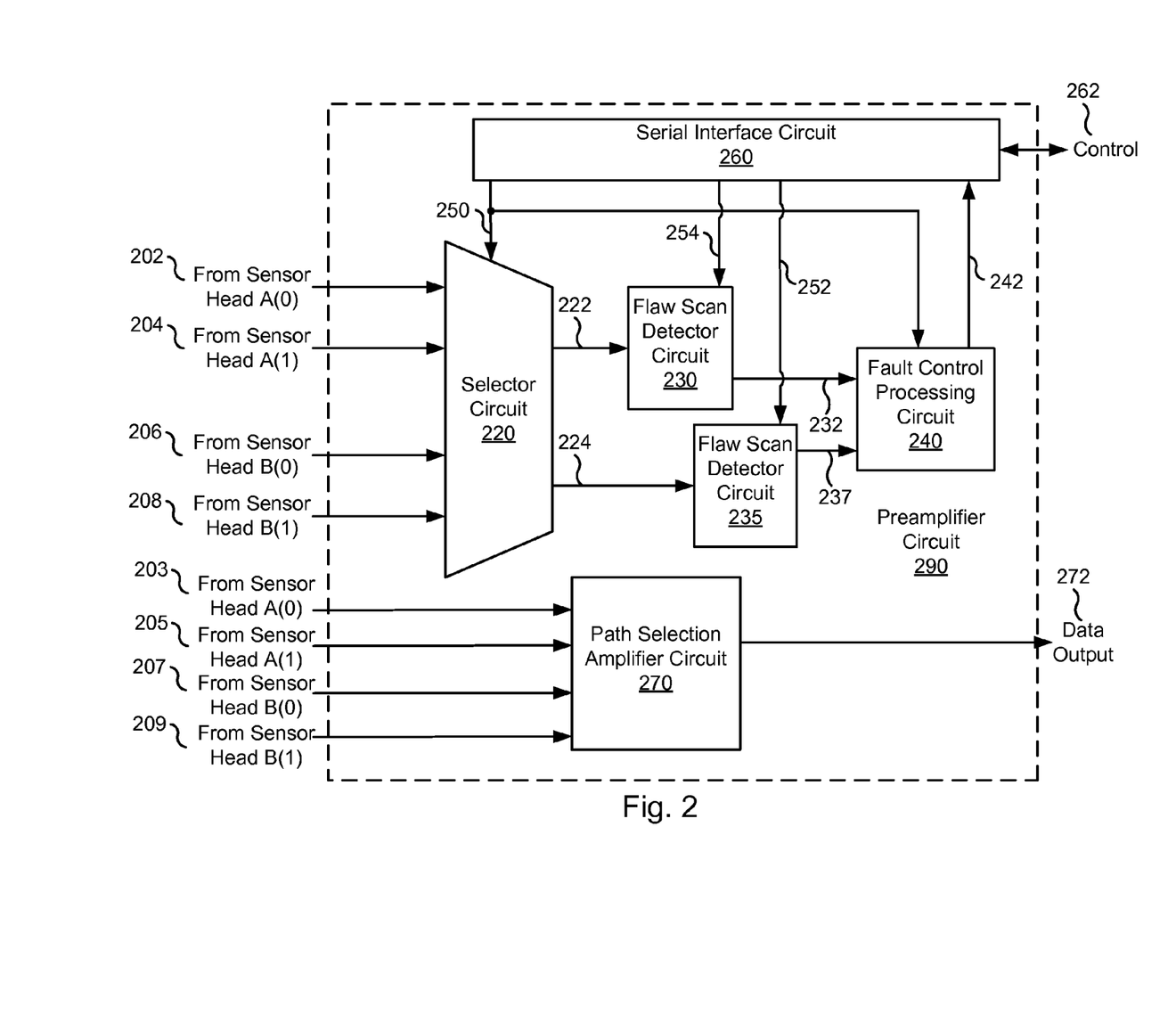
FIG. 2 shows a preamplifier circuit including multi-stream fault detection circuitry that may be used in relation to one or more embodiments of the present invention.
Figure 3:
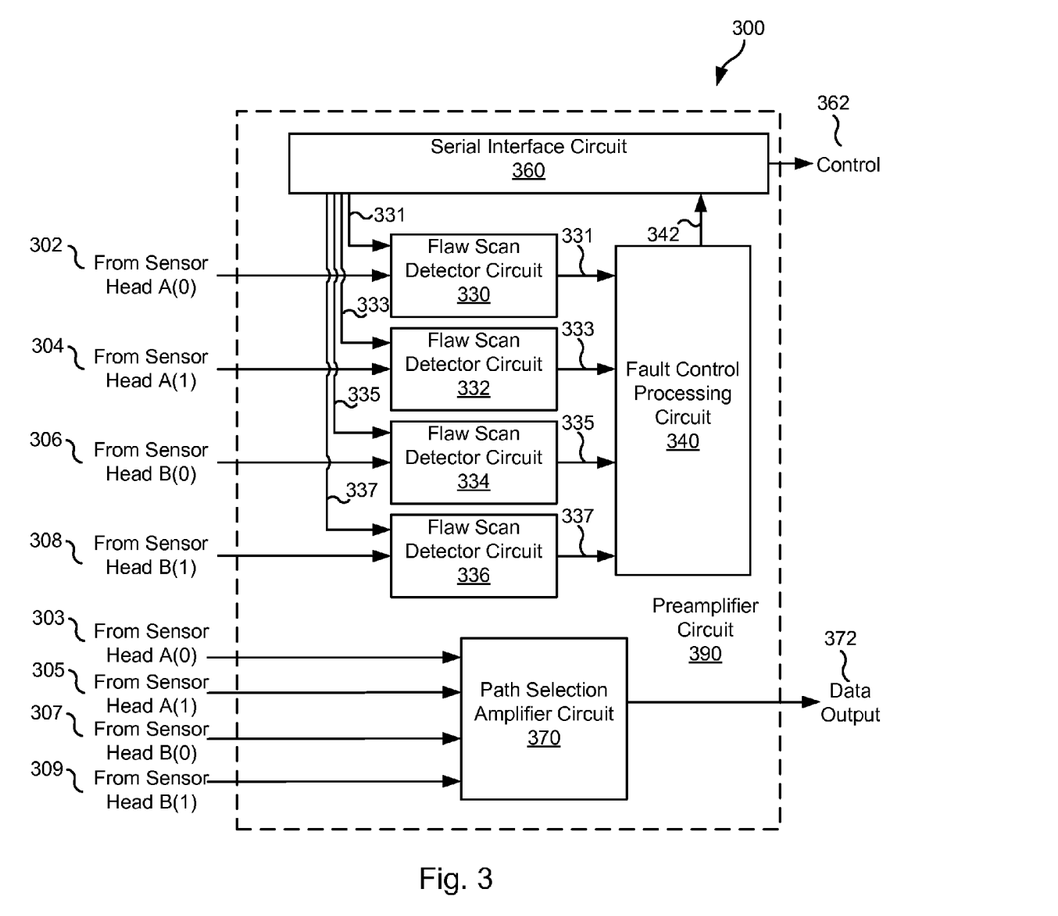
FIG. 3 shows another preamplifier circuit including multi-stream fault detection circuitry that may be used in relation to other embodiments of the present invention.

Turning to FIG. 2, a preamplifier circuit 290 including multi-stream fault detection circuitry is shown that may be used in relation to one or more embodiments of the present invention. Preamplifier circuit 290 includes a selector circuit 220 that receives temperature and data signals from heads disposed in relation to respective surfaces of a storage medium (not shown). In some embodiments of the present invention, selector circuit 220 is a multiplexer circuit. In this case, four storage medium surfaces are covered by corresponding heads (head A(0) (providing data 202 and temperature 203), head A(1) (providing data 204 and temperature 205), head B(0) (providing data 206 and temperature 207), and head B(1) (providing data 208 and temperature 209). It should be noted that while preamplifier circuit 290 is shown as receiving information from four surfaces in parallel, that other embodiments of the present invention may receive information from more or fewer surfaces.

A serial interface circuit 260 controls the operation of preamplifier circuit 290 via a serial control I/O 262. Serial control I/O 262 provides for communicating fault information to a host controller (not shown) and for receiving program control from the host control circuit. Serial interface circuit 260 may implement any type of serial interface known in the art. Based upon the disclosure provided herein, one of ordinary skill in the art will recognize a variety of serial interfaces that may be used in relation to different embodiments of the present invention.

Selector circuit 220 selects one of temperature information from either head A(0) 202 or head B(0) 206 as selected data 222 that is provided to a flaw scan detector circuit 230, and selects one of temperature data from either head A(1) 204 or head B(1) 208 as selected data 224 that is provided to a flaw scan detector circuit 235. Selection by selector circuit 220 is controlled by a selector control 250 provided from serial interface control circuit 260. As such, a host controller circuit can select which surfaces are scanned at any given time using serial control I/O 262. This same selector control 250 is provided to a fault control processing circuit 240 that formats any fault information 242 to be provided to the host controller via serial interface circuit 260.

Flaw scan detector circuit 230 and flaw scan detector circuit 235 are each able to identify temperature information received as part of selected data 222 and selected data 224, respectively. Flaw scan detector circuit 230 may be any circuit known in the art that is capable of receiving thermal asperity information (i.e., temperature based information) derived from a temperature sensor disposed in relation to a storage medium, and making a determination as to whether a particular location on the storage medium represented by the thermal asperity information. Some example flaw scan circuits that may be used in relation to embodiments of the present invention are disclosed in U.S. Pat. No. 8,792,198 entitled "High Impedance Low Noise Cross-Coupled Amplifier for use in a Preamplifier in a Magnetic Data Storage System" or U.S. Pat. No. 8,698,554 entitled "Second Order Active high-Pass Filter with Cross-Coupled Feedback for Q Enhancement". Both of the aforementioned patents are incorporated herein by reference for all purposes. Based upon the disclosure provided herein, one of ordinary skill in the art will recognize a variety of temperature based flaw detection circuits that may be used to implement flaw scan detector circuit 230. Similarly, flaw scan detector circuit 235 may be any circuit known in the art that is capable of receiving thermal asperity information derived from a temperature sensor disposed in relation to a storage medium, and making a determination as to whether a particular location on the storage medium represented by the thermal asperity information. Based upon the disclosure provided herein, one of ordinary skill in the art will recognize a variety of temperature based flaw detection circuits that may be used to implement flaw scan detector circuit 235. In some embodiments of the present invention, each of flaw scan detector circuit 230 and flaw scan detector circuit 235 are independently programmable to extract defect signatures from signals coming into the preamplifier from multiple temperature sensors located external to preamplifier circuit 290. This independent programming is performed via control signals 254 and control signals 252 from serial interface control circuit 260. In this way, a host controller circuit can independently program flaw scan detector circuit 230 and flaw scan detector circuit 235 using serial control I/O 262. It should be noted that while preamplifier circuit 290 includes two flaw scan detector circuits, that other embodiments of the present invention may include three or more flaw scan detector circuits.

Where a flaw is identified by flaw scan detector circuit 230, a fault output 232 is asserted. Similarly, where a flaw is identified by flaw scan detector circuit 235, a fault output 237 is asserted. Fault output 232 and fault output 237 are provided to fault control processing circuit 240 that combines the fault information into a unified fault message provided as fault information 242 to serial interface circuit 260. In some cases, the fault message indicates a surface which the fault is associated and a duration of the fault. The duration is generated based upon the period that fault output 232 and/or fault output 237 are asserted, and the surface information is generated based upon a combination fault output 232, fault output 237 and selector control 250. Based upon the disclosure provided herein, one of ordinary skill in the art will recognize other information sets that may be provided to the host controller as fault information 242. The host controller receiving fault information 242 via serial interface circuit 260 maps the location on a surface where a fault is detected and uses the map to assure that data is not stored to the identified location.

In addition, preamplifier circuit 290 includes a path selection amplifier circuit 270 that is capable of selecting data from one of head A(0) 203, head A(1) 205, head B(0) 207, or head B(1) 209, retrieving the sensed data from the selected head, and amplifying the selected sensed data to yield a data output 272 that is provided to a data processing circuit (not shown) that is designed to recover data originally stored to a storage medium. Based upon the disclosure provided herein, one of ordinary skill in the art will recognize a variety of implementations of path selection amplifier circuit 270 that may be used in relation to different embodiments of the present invention. Although not shown, path selection may be controlled by a host controller via serial interface circuit 260.

Turning to FIG. 3, another preamplifier circuit 300 including multi-stream fault detection circuitry is shown that may be used in relation to other embodiments of the present invention. Preamplifier circuit 390 includes: a flaw scan detector circuit 330 receiving temperature information from a sensor head A(0) 302, a flaw scan detector circuit 332 receiving temperature information from a sensor head A(1) 304, a flaw scan detector circuit 334 receiving temperature information from a sensor head B(0) 306, and, a flaw scan detector circuit 336 receiving temperature information from a sensor head B(1) 308. It should be noted that while preamplifier circuit 390 is shown as receiving information from four surfaces in parallel, that other embodiments of the present invention may receive information from more or fewer surfaces.

A serial interface circuit 360 controls the operation of preamplifier circuit 390 via a serial control I/O 362. Serial control I/O 362 provides for communicating fault information to a host controller (not shown) and for receiving program control from the host control circuit. Serial interface circuit 360 may implement any type of serial interface known in the art. Based upon the disclosure provided herein, one of ordinary skill in the art will recognize a variety of serial interfaces that may be used in relation to different embodiments of the present invention.

Flaw scan detector circuit 330, flaw scan detector circuit 332, flaw scan detector circuit 334, and flaw scan detector circuit 336 are each able to identify temperature information received as part of the received data. Flaw scan detector circuit 330 may be any circuit known in the art that is capable of receiving thermal asperity information (i.e., temperature based information) derived from a temperature sensor disposed in relation to a storage medium, and making a determination as to whether a particular location on the storage medium represented by the thermal asperity information. Based upon the disclosure provided herein, one of ordinary skill in the art will recognize a variety of temperature based flaw detection circuits that may be used to implement flaw scan detector circuit 330. Similarly, flaw scan detector circuits 332, 334 and 336 may be any circuit known in the art that is capable of receiving thermal asperity information derived from a temperature sensor disposed in relation to a storage medium, and making a determination as to whether a particular location on the storage medium represented by the thermal asperity information. Based upon the disclosure provided herein, one of ordinary skill in the art will recognize a variety of temperature based flaw detection circuits that may be used to implement flaw scan detector circuits 332, 334 and 336. In some embodiments of the present invention, each of flaw scan detector circuit 330, flaw scan detector circuit 332, flaw scan detector circuit 334, and flaw scan detector circuit 336 are independently programmable to extract defect signatures from signals coming into the preamplifier from multiple temperature sensors located external to preamplifier circuit 390. This independent programming is performed via control signals 331, control signals 333, control signals 335, and control signals 337 from serial interface control circuit 360. In this way, a host controller circuit can independently program flaw scan detector circuit 330, flaw scan detector circuit 332, flaw scan detector circuit 334, and flaw scan detector circuit 336 independently using serial control I/O 362. It should be noted that while preamplifier circuit 390 includes four flaw scan detector circuits, that other embodiments of the present invention may include fewer or more flaw scan detector circuits.

Where a flaw is identified by flaw scan detector circuit 330, a fault output 331 is asserted. Similarly, where a flaw is identified by flaw scan detector circuit 332, a fault output 333 is asserted; where a flaw is identified by flaw scan detector circuit 334, a fault output 335 is asserted; and where a flaw is identified by flaw scan detector circuit 336, a fault output 337 is asserted. Fault output 331, fault output 333, fault output 335 and fault output 337 are provided to fault control processing circuit 340 that combines the fault information into a unified fault message provided as fault information 342 to serial interface circuit 360. In some cases, the fault message indicates a surface which the fault is associated and a duration of the fault. The duration is generated based upon the period that fault output 331, fault output 333, fault output 335 and/or fault output 337 are asserted, and the surface information is generated based upon a combination of fault output 331, fault output 333, fault output 335 and fault output 337. Based upon the disclosure provided herein, one of ordinary skill in the art will recognize other information sets that may be provided to the host controller as fault information 342. The host controller receiving fault information 342 via serial interface circuit 360 maps the location on a surface where a fault is detected and uses the map to assure that data is not stored to the identified location.

In addition, preamplifier circuit 390 includes a path selection amplifier circuit 370 that is capable of selecting data from one of head A(0) 303, head A(1) 305, head B(0) 307, or head B(1) 309, retrieving the sensed data from the selected head, and amplifying the selected sensed data to yield a data output 372 that is provided to a data processing circuit (not shown) that is designed to recover data originally stored to a storage medium. Based upon the disclosure provided herein, one of ordinary skill in the art will recognize a variety of implementations of path selection amplifier circuit 370 that may be used in relation to different embodiments of the present invention. Although not shown, path selection may be controlled by a host controller via serial interface circuit 360.

Figure 4:
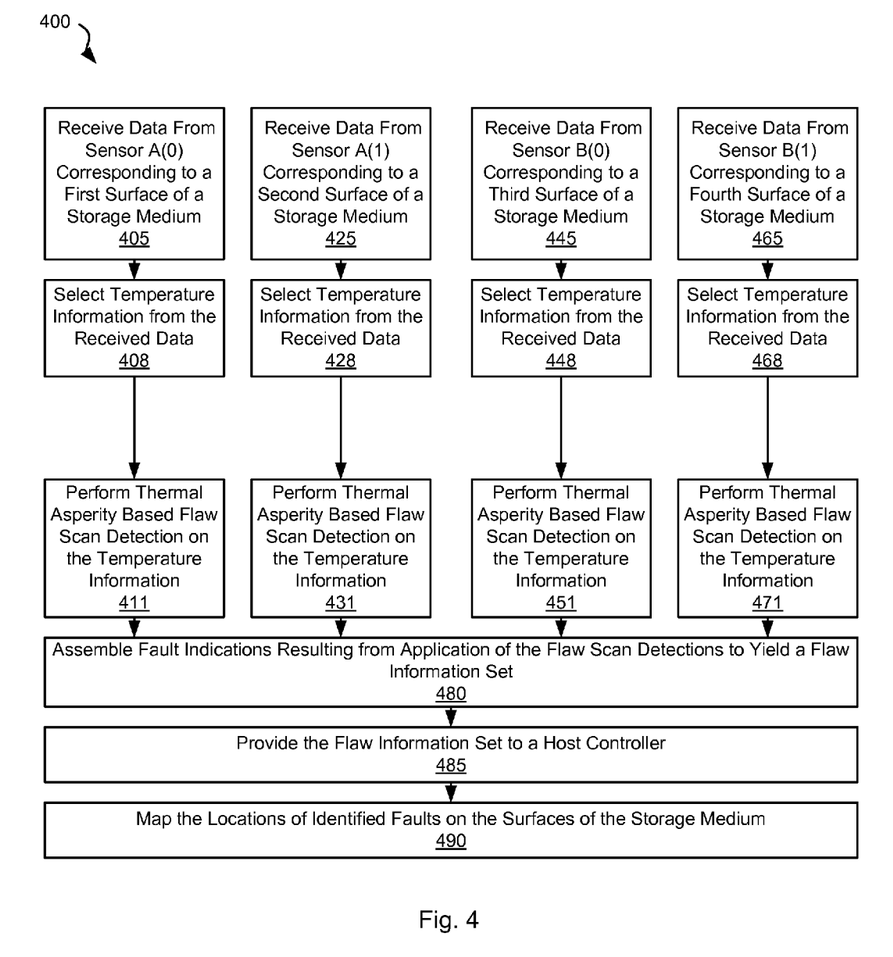
FIG. 4 is a flow diagram showing a method for fault detection in accordance with some embodiments of the present invention.

Turning to FIG. 4, a flow diagram 400 shows a method for fault detection in accordance with some embodiments of the present invention. Following flow diagram 400, data is received by a first sensor (i.e., a Sensor A(0)) disposed in relation to a first surface of a storage medium (block 405). Temperature information from the received data is extracted (block 408). This temperature information is derived from a temperature sensor of a read/write head disposed in relation to the first surface of the storage medium. Thermal asperity based flaw scan detection is applied to the temperature information to yield one or more fault indications where a change in the temperature information indicates a flaw on the first surface of the storage medium (block 411). The thermal asperity based flaw scan detection may be any temperature based flaw scan detection known in the art that receives thermal asperity information (i.e., temperature based information) derived from a temperature sensor disposed in relation to a storage medium, and makes a determination as to whether a particular location on the storage medium represented by the thermal asperity information. Based upon the disclosure provided herein, one of ordinary skill in the art will recognize a variety of thermal asperity based flaw scan detection approaches that may be used in relation to different embodiments of the present invention.

Similarly, data is received by a second sensor (i.e., a Sensor A(1)) disposed in relation to a second surface of the storage medium (block 425). Temperature information from the received data is extracted (block 428). This temperature information is derived from a temperature sensor of a read/write head disposed in relation to the second surface of the storage medium. Thermal asperity based flaw scan detection is applied to the temperature information to yield one or more fault indications where a change in the temperature information indicates a flaw on the second surface of the storage medium (block 431). Similarly, data is received by a third sensor (i.e., a Sensor B(0)) disposed in relation to a third surface of the storage medium (block 445). Temperature information from the received data is extracted (block 448). This temperature information is derived from a temperature sensor of a read/write head disposed in relation to the third surface of the storage medium. Thermal asperity based flaw scan detection is applied to the temperature information to yield one or more fault indications where a change in the temperature information indicates a flaw on the third surface of the storage medium (block 451). Similarly, data is received by a fourth sensor (i.e., a Sensor B(1)) disposed in relation to a fourth surface of the storage medium (block 465). Temperature information from the received data is extracted (block 468). This temperature information is derived from a temperature sensor of a read/write head disposed in relation to the fourth surface of the storage medium. Thermal asperity based flaw scan detection is applied to the temperature information to yield one or more fault indications where a change in the temperature information indicates a flaw on the fourth surface of the storage medium (block 471).

The fault indications resulting from each of the applications of the flaw scan detections are assembled into a flaw information set (block 480). The flaw information set indicates a time when the flaw indication was detected and a surface on which the flaw indication was detected. Based upon the disclosure provided herein, one of ordinary skill in the art will recognize a variety of combinations of information that may be included in the flaw information set. The flaw information set is provided to a host controller (block 485). The host controller uses the received flaw information set along with the control information provided to a storage device that controls the location of the sensors relative to the storage medium to map the locations of identified faults on the surfaces of the storage medium (block 490).

Figure 5:
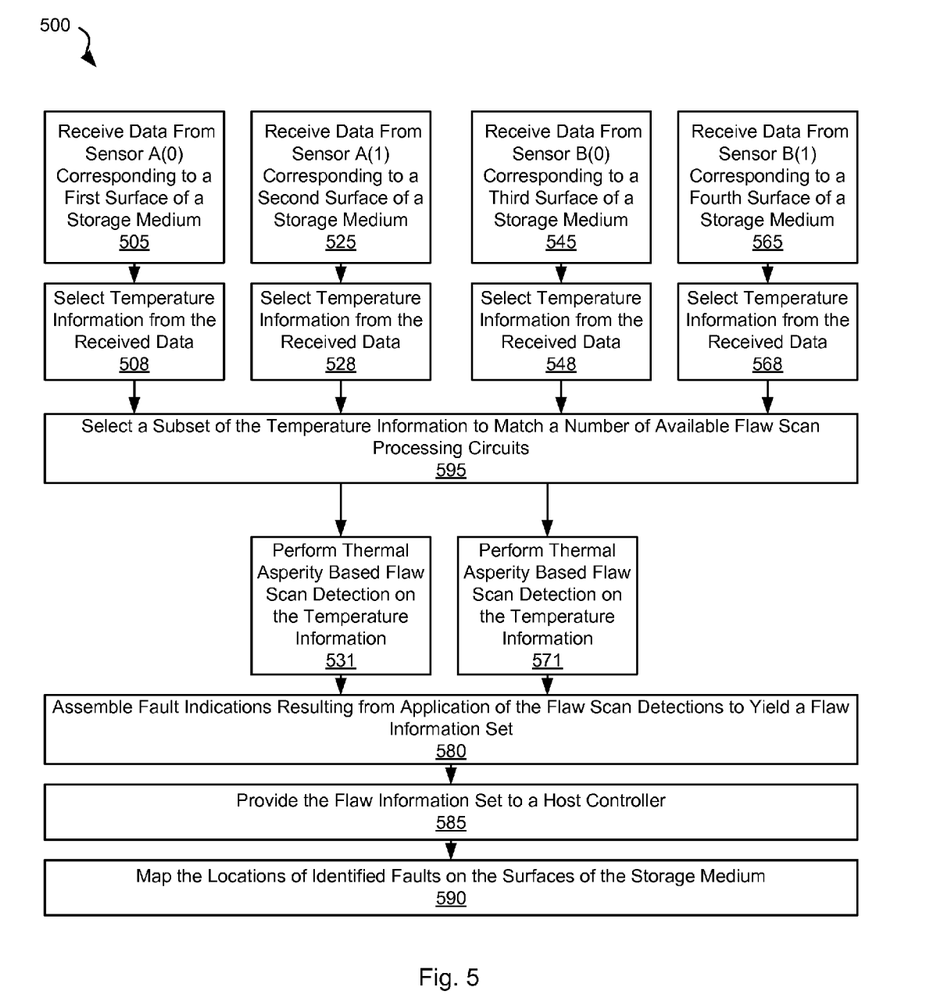
FIG. 5 is a flow diagram showing another method for fault detection in accordance with some embodiments of the present invention.
Figure 6:
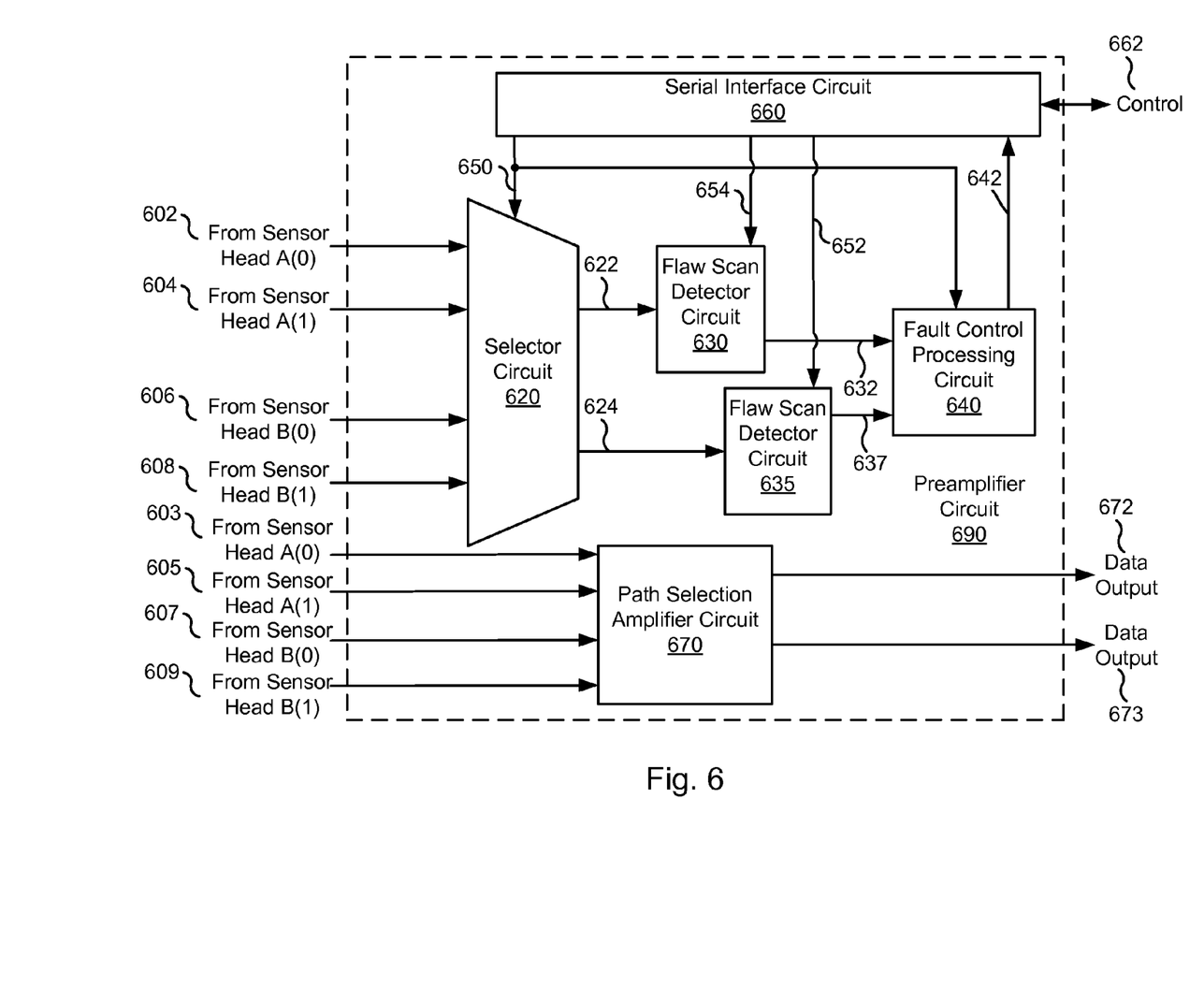
FIG. 6 shows another preamplifier circuit including multi-stream fault detection circuitry that may be used in relation to one or more embodiments of the present invention.

Turning to FIG. 5, a flow diagram 500 shows another method for fault detection in accordance with some embodiments of the present invention. Following flow diagram 400, data is received by a first sensor (i.e., a Sensor A(0)) disposed in relation to a first surface of a storage medium (block 505). Temperature information from the received data is extracted (block 508). This temperature information is derived from a temperature sensor of a read/write head disposed in relation to the first surface of the storage medium. Similarly, data is received by a second sensor (i.e., a Sensor A(1)) disposed in relation to a second surface of the storage medium (block 525). Temperature information from the received data is extracted (block 528). This temperature information is derived from a temperature sensor of a read/write head disposed in relation to the second surface of the storage medium. Similarly, data is received by a third sensor (i.e., a Sensor B(0)) disposed in relation to a third surface of the storage medium (block 545). Temperature information from the received data is extracted (block 548). This temperature information is derived from a temperature sensor of a read/write head disposed in relation to the third surface of the storage medium. Similarly, data is received by a fourth sensor (i.e., a Sensor B(1)) disposed in relation to a fourth surface of the storage medium (block 565). Temperature information from the received data is extracted (block 568). This temperature information is derived from a temperature sensor of a read/write head disposed in relation to the fourth surface of the storage medium.

A subset of the temperature information is selected to match a number of available flaw scan processing circuits (block 595). The selection is made based upon input from a host controller. For example, if two flaw scan processing circuits are available, then temperature information from two of the sensors is selected. It should be noted that any number of two or more flaw scan detection circuits may be used in relation to different embodiments of the present invention. The selected subset of the temperature information is provided to the available flaw scan processing circuits. Thermal asperity based flaw scan detection is applied to the selected subsets of the temperature information to yield one or more fault indications corresponding to the surface of the storage medium to which the selected temperature information corresponds (blocks 531, 571). The thermal asperity based flaw scan detection may be any temperature based flaw scan detection known in the art that receives thermal asperity information (i.e., temperature based information) derived from a temperature sensor disposed in relation to a storage medium, and makes a determination as to whether a particular location on the storage medium represented by the thermal asperity information. Based upon the disclosure provided herein, one of ordinary skill in the art will recognize a variety of thermal asperity based flaw scan detection approaches that may be used in relation to different embodiments of the present invention.

The fault indications resulting from each of the applications of the flaw scan detections are assembled into a flaw information set (block 580). The flaw information set indicates a time when the flaw indication was detected and a surface on which the flaw indication was detected. Based upon the disclosure provided herein, one of ordinary skill in the art will recognize a variety of combinations of information that may be included in the flaw information set. The flaw information set is provided to the host controller (block 585). The host controller uses the received flaw information set along with the control information provided to a storage device that controls the location of the sensors relative to the storage medium to map the locations of identified faults on the surfaces of the storage medium (block 590).

Turning to FIG. 6, a preamplifier circuit 690 including multi-stream fault detection circuitry is shown that may be used in relation to one or more embodiments of the present invention. Preamplifier circuit 690 includes a selector circuit 620 that receives temperature and data signals from heads disposed in relation to respective surfaces of a storage medium (not shown). In some embodiments of the present invention, selector circuit 620 is a multiplexer circuit. In this case, four storage medium surfaces are covered by corresponding heads (head A(0) (providing data 602 and temperature 603), head A(1) (providing data 604 and temperature 605), head B(0) (providing data 606 and temperature 607), and head B(1) (providing data 608 and temperature 609). It should be noted that while preamplifier circuit 690 is shown as receiving information from four surfaces in parallel, that other embodiments of the present invention may receive information from more or fewer surfaces.

A serial interface circuit 660 controls the operation of preamplifier circuit 690 via a serial control I/O 662. Serial control I/O 662 provides for communicating fault information to a host controller (not shown) and for receiving program control from the host control circuit. Serial interface circuit 660 may implement any type of serial interface known in the art. Based upon the disclosure provided herein, one of ordinary skill in the art will recognize a variety of serial interfaces that may be used in relation to different embodiments of the present invention.

Selector circuit 620 selects one of temperature information from either head A(0) 602 or head B(0) 606 as selected data 622 that is provided to a flaw scan detector circuit 630, and selects one of temperature data from either head A(1) 604 or head B(1) 608 as selected data 624 that is provided to a flaw scan detector circuit 635. Selection by selector circuit 620 is controlled by a selector control 650 provided from serial interface control circuit 660. As such, a host controller circuit can select which surfaces are scanned at any given time using serial control I/O 662. This same selector control 650 is provided to a fault control processing circuit 640 that formats any fault information 642 to be provided to the host controller via serial interface circuit 660.

Flaw scan detector circuit 630 and flaw scan detector circuit 635 are each able to identify temperature information received as part of selected data 622 and selected data 624, respectively. Flaw scan detector circuit 630 may be any circuit known in the art that is capable of receiving thermal asperity information (i.e., temperature based information) derived from a temperature sensor disposed in relation to a storage medium, and making a determination as to whether a particular location on the storage medium represented by the thermal asperity information. Based upon the disclosure provided herein, one of ordinary skill in the art will recognize a variety of temperature based flaw detection circuits that may be used to implement flaw scan detector circuit 630. Similarly, flaw scan detector circuit 635 may be any circuit known in the art that is capable of receiving thermal asperity information derived from a temperature sensor disposed in relation to a storage medium, and making a determination as to whether a particular location on the storage medium represented by the thermal asperity information. Based upon the disclosure provided herein, one of ordinary skill in the art will recognize a variety of temperature based flaw detection circuits that may be used to implement flaw scan detector circuit 635. In some embodiments of the present invention, each of flaw scan detector circuit 630 and flaw scan detector circuit 635 are independently programmable to extract defect signatures from signals coming into the preamplifier from multiple temperature sensors located external to preamplifier circuit 690. This independent programming is performed via control signals 654 and control signals 652 from serial interface control circuit 660. In this way, a host controller circuit can independently program flaw scan detector circuit 630 and flaw scan detector circuit 635 using serial control I/O 662. It should be noted that while preamplifier circuit 690 includes two flaw scan detector circuits, that other embodiments of the present invention may include three or more flaw scan detector circuits.

Where a flaw is identified by flaw scan detector circuit 630, a fault output 632 is asserted. Similarly, where a flaw is identified by flaw scan detector circuit 635, a fault output 637 is asserted. Fault output 632 and fault output 637 are provided to fault control processing circuit 640 that combines the fault information into a unified fault message provided as fault information 642 to serial interface circuit 660. In some cases, the fault message indicates a surface which the fault is associated and a duration of the fault. The duration is generated based upon the period that fault output 632 and/or fault output 637 are asserted, and the surface information is generated based upon a combination fault output 632, fault output 637 and selector control 650. Based upon the disclosure provided herein, one of ordinary skill in the art will recognize other information sets that may be provided to the host controller as fault information 642. The host controller receiving fault information 642 via serial interface circuit 660 maps the location on a surface where a fault is detected and uses the map to assure that data is not stored to the identified location.

In addition, preamplifier circuit 690 includes a path selection amplifier circuit 670 that is capable of selecting data from heads corresponding to that selected by selector circuit 620. For example, when selector circuit 620 selects information from head A(0) 602 and head A(1) 604, then path selection amplifier circuit 670 selects data from: head A(0) 603 which is amplified and provided as a data output 672, and head A(1) 605 which is amplified and provided as a data output 673. Alternatively, when selector circuit 620 selects information from head B(0) 606 and head B(1) 608, then path selection amplifier circuit 670 selects data from: head B(0) 607 which is amplified and provided as a data output 672, and head B(1) 609 which is amplified and provided as a data output 673. Based upon the disclosure provided herein, one of ordinary skill in the art will recognize a variety of implementations of path selection amplifier circuit 670 that may be used in relation to different embodiments of the present invention. Although not shown, path selection may be controlled by a host controller via serial interface circuit 660. Data outputs 672, 673 may be provided to downstream data processing circuitry in a read channel circuit that operates to recover data originally stored to a disk platter. In addition, an alternative flaw scan (for example, a magnetic based flaw scan as known in the art) may be applied to data outputs 672, 673 in parallel to the temperature based flaw scan performed by flaw scan detector circuits 630, 635.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent, albeit such a system would not be a circuit. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A preamplifier circuit, the circuit comprising:
a single integrated circuit including:
a first flaw scan detector circuit operable identify a first flaw on a first surface of a storage medium based upon a first information set corresponding to the first surface; and
a second flaw scan detector circuit operable identify a second flaw on a second surface of a storage medium based upon a second information set corresponding to the first surface.

2. The preamplifier circuit of claim 1, wherein the single integrated circuit further includes:
an amplifier circuit operable to amplify a third information set derived from a third sensor.

3. The preamplifier circuit of claim 2, wherein:
the information corresponding to the first surface is derived from a first sensor disposed in relation to the first surface; and
the information corresponding to the second surface is derived from a second sensor disposed in relation to the second surface.

4. The preamplifier circuit of claim 3, wherein the preamplifier circuit is implemented as part of a storage system, and wherein the storage system includes:
a head disposed in relation to the first surface of the storage medium, wherein the head includes the first sensor and the third sensor.

5. The preamplifier circuit of claim 4, wherein the first sensor is a temperature sensor, and the third sensor is a data sensor.

6. The preamplifier circuit of claim 4, wherein the storage system further includes:
the storage medium.

7. The preamplifier circuit of claim 6, wherein the storage system is a hard disk drive.

8. The preamplifier circuit of claim 1, wherein the first flaw scan detector is a first thermal asperity based flaw scan detector circuit, and wherein the second flaw scan detector is a second thermal asperity based flaw scan detector circuit.

9. The preamplifier circuit of claim 1, wherein the single integrated circuit further includes:
a selector circuit operable to:
receive a first input derived from a first sensor disposed in relation to the first surface, a second input derived from a second sensor disposed in relation to the second surface, and a third input derived from a third sensor disposed in relation to a third surface;
select the first input as the first information set; and
select the second input as the second information set.

10. The preamplifier circuit of claim 1, wherein a first parameter governing operation of the first flaw scan detector circuit is programmable to a value independent of a second parameter governing operation of the second flaw scan detector circuit.

11. A method for performing storage surface flaw scan, the method comprising:
providing a single integrated circuit including:
a first flaw scan detector circuit; and
a second flaw scan detector circuit;
receiving a first information set corresponding to a first surface;
applying a first flaw scan detection algorithm by the first flaw scan detector circuit to identify a first flaw on the first surface;
receiving a second information set corresponding to a second surface; and
applying a second flaw scan detection algorithm by the second flaw scan detector circuit to identify a second flaw on the second surface.

12. The method of claim 11, wherein the single integrated circuit further includes an amplifier circuit, and wherein the method further comprises:
   amplifying a third information set derived from a third sensor.

13. The method of claim 12, wherein the information corresponding to the first surface is derived from a first sensor disposed in relation to the first surface, and the information corresponding to the second surface is derived from a second sensor disposed in relation to the second surface.

14. The method of claim 12, wherein the first sensor and the third sensor are incorporated in a head, the method further comprising:
   disposing the head in relation to the first surface of the storage medium.

15. The method of claim 14, wherein the first sensor is a temperature sensor, and the third sensor is a data sensor.

16. The method of claim 11, wherein the first flaw scan detector is a first thermal asperity based flaw scan detector circuit, and wherein the second flaw scan detector is a second thermal asperity based flaw scan detector circuit.

17. The method of claim 11, the method further comprising:
   receiving a first input derived from a first sensor disposed in relation to the first surface at the single integrated circuit;
   receiving a second input derived from a second sensor disposed in relation to the second surface at the single integrated circuit;
   receiving and a third input derived from a third sensor disposed in relation to a third surface at the single integrated circuit;
   selecting the first input as the first information set; and
   selecting the second input as the second information set.

18. The method of claim 11, the method further comprising:
   programming a first parameter governing operation of the first flaw scan detector circuit;
   programming a second parameter governing operation of the second flaw scan detector circuit; and
   wherein programming the first parameter is independent of programming the second parameter.

19. A preamplifier system, the system comprising:
   a first means for identifying a first flaw on a first surface of a storage medium based upon a first information set corresponding to the first surface;
   a second means for identifying a second flaw on a second surface of a storage medium based upon a second information set corresponding to the second surface in parallel to operation of the first means; and
   an amplifier circuit, and wherein the first means, the second means and the amplifier circuit are implemented on the same integrated circuit.

\* \* \* \* \*